(12) United States Patent
Yang

(10) Patent No.: US 8,434,900 B2
(45) Date of Patent: May 7, 2013

(54) RING-SHAPED ILLUMINATING APPARATUS WITH VARIABLE PROJECTION ANGLE

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 266 days.

(21) Appl. No.: 13/093,005

(22) Filed: Apr. 25, 2011

(65) Prior Publication Data
US 2012/0075861 A1 Mar. 29, 2012

(30) Foreign Application Priority Data
Sep. 24, 2010 (TW) .............................. 99132309 A

(51) Int. Cl.
*F21S 4/00* (2006.01)
(52) U.S. Cl.
USPC ............ 362/249.03; 362/249.02; 362/249.06; 362/405
(58) Field of Classification Search ............. 362/249.02, 362/249.03, 249.06, 405
See application file for complete search history.

(56) References Cited

U.S. PATENT DOCUMENTS

| 8,047,682 B2 * | 11/2011 | Zheng et al. ............. 362/249.05 |
| 2009/0231838 A1 * | 9/2009 | Kim .............................. 362/158 |
| 2011/0170288 A1 * | 7/2011 | Kim .............................. 362/235 |
| 2012/0155088 A1 * | 6/2012 | Spaccasassi et al. .... 362/249.04 |

* cited by examiner

*Primary Examiner* — Evan Dzierzynski
(74) *Attorney, Agent, or Firm* — Chun-Ming Shih; HDLS IPR Services

(57) ABSTRACT

A ring-shaped illuminating apparatus with variable projection angle includes a fixing ring, a plurality of swing plates and a plurality of light elements. The fixing ring is connected to the camera. The swing plates each have a fixing end pivotally connected to the fixing ring and a free end away from the fixing end. The swing plates can change their status from an opened status to a closed status. While in the closed status, the free ends of the swing plates are close to each other. While in the opened status, the free ends of the swing plates are away from each other. Each of the swing plates has an inner face and an outer face opposite to the inner face. The inner faces of the swing plates face to each other in the closed status. The light elements are respectively arranged on the inner faces of the swing plates.

14 Claims, 6 Drawing Sheets

RING-SHAPED ILLUMINATING APPARATUS WITH VARIABLE PROJECTION ANGLE

BACKGROUND OF THE INVENTION

1. Field of the Invention

The present invention relates to an illuminating apparatus, in particular to a ring-shaped illuminating apparatus with variable projection angle for photography.

2. Description of Related Art

Macro photography (or close-up photography) is to capture images of objects by photographic devices like cameras at a distance within about 30 cm. In recent years, applications of macro photography extend from ecological photography of animals and plants to high-magnification visual inspection and non-destructive inspection required in manufacturing processes of industrial products.

In the field of macro photography, the requirement of the illumination for objects is more important in comparison with normal photography. Since conventional ring-shaped flashlights installed on the lenses can not provide steady illumination, but can only provide instant flash illumination on the objects at the moment of shooting images, users can not predict if there will be enough illumination on the object before shooting. Therefore, users have to adjust the aperture and shutter speed of cameras in advance only based on their own experience, which leads to a higher failure rate of shooting.

Recently, many ring-shaped lights adopt cold cathode fluorescent lamps (CCFLs) or light emitting diodes (LEDs) as their light sources, which can provide steady illumination on objects for users to observe before shooting images. However, since the objects are very close to the ring-shaped light in the application of macro photographing, the light projected by the ring-shaped light will cause a non-uniform brightness distribution with a darker center portion and a brighter outer portion.

SUMMARY OF THE INVENTION

The objective of the present invention is to provide a ring-shaped illuminating apparatus with variable projection angle, capable of providing uniform brightness illumination on objects to be shot.

To achieve the mentioned objective, the present invention provides a ring-shaped illuminating apparatus with variable projection angle, which can be used for arranging on a camera. The ring-shaped illuminating apparatus includes a fixing ring, a plurality of swing plates and a plurality of light elements. The fixing ring is connected to the camera. The swing plates each has a fixing end pivotally connected to the fixing ring and a free end away from the fixing end. The swing plates can change their status from an opened status to a closed status. While in the closed status, the free ends of the swing plates are close to each other. While in the opened status, the free ends of the swing plates are away from each other. Each of the swing plates has an inner face and an outer face opposite to the inner face. The inner faces of the swing plates face to each other in the closed status. The light elements are respectively arranged on the inner faces of the swing plates.

Besides, the present invention also provides another ring-shaped illuminating apparatus with variable projection angle, which can be used for arranging on a camera. The ring-shaped illuminating apparatus includes a fixing ring, a plurality of swing plates and a plurality of light elements. The fixing ring is connected to the camera. The swing plates each has a fixing end pivotally connected to the fixing ring and a free end away from the fixing end. The swing plates can change their status from an opened status to a closed status. While in the closed status, the free ends of the swing plates are close to each other. While in the opened status, the free ends of the swing plates are away from each other. Each of the swing plates has an inner face and an outer face opposite to the inner face. The inner faces of the swing plates face to each other in the closed status. The light elements are respectively arranged on the fixing ring and emit light toward the inner faces of the swing plates.

DETAILED DESCRIPTION OF THE INVENTION

The present invention is described below in detailed with the reference to accompanying drawings. It should be mentioned that the drawings are provided for illustration only and the invention is not limited to the drawings.

Figure 1:
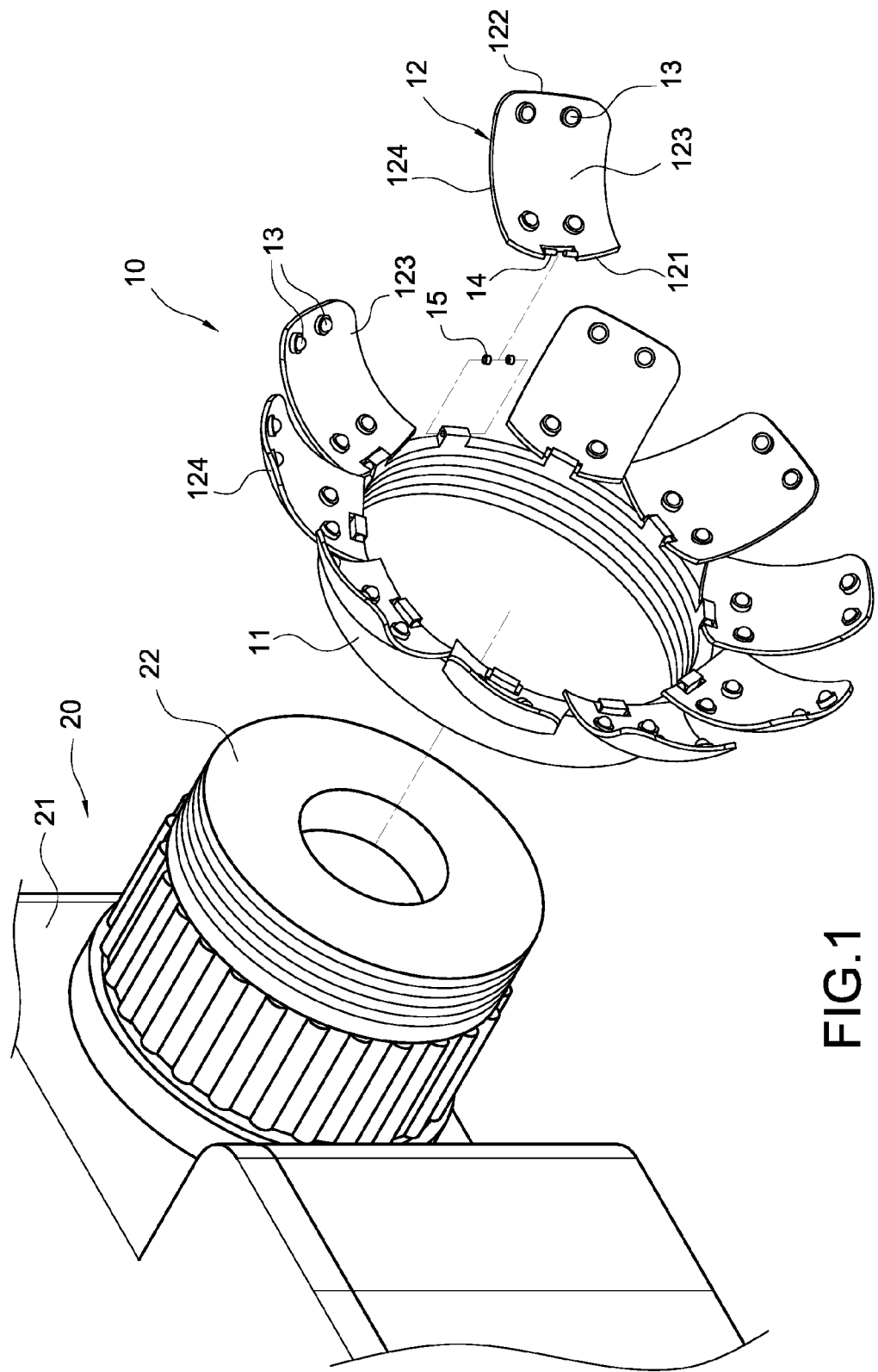
FIG. 1 is an explosive view of the illuminating apparatus according to the first embodiment of the present invention.

FIG. 1 shows a ring-shaped illuminating apparatus 10 with variable projection angle according to a first embodiment of the present invention. The illuminating apparatus 10 is used to connect to a camera 20 for illuminating objects. In this embodiment, the camera 20 is a commercial digital camera 20. In practical use, the camera 20 can be a digital single lens reflex camera (DSLR) or an image capturing module on a portable electronic device. The camera 20 has main body 21 and a lens 22 connected to the main body 21.

The ring-shaped illuminating apparatus 10 is connected the front of the lens 22. The ring-shaped illuminating apparatus 10 has a fixing ring 11, a plurality of swing plates 12 and a plurality of light elements 13. The fixing ring 11 is connected to the lens 22. The connection means can be screw connection which is easy for attaching and detaching. The swing plates 12 each have a fixing end 121 pivotally connected to the fixing ring 11 and a free end 122 away from the fixing end 121. Besides, each of the swing plates 12 is of bowl shape and has a concave inner face 123 and a convex outer face 124. The light elements 13 can be light emitting diodes which are respectively arranged on the inner face 123 of the swing plates 12.

Specifically, a plurality of pivot pins 14 are provided for pivotally connecting the swing plates 12 to the fixing ring 11. Besides, a plurality of elastic members 15 are respectively arranged on the pivot pins 14 and located between the fixing ring 11 and the swing plates 12. The elastic members 15 can provide friction force to the fixing ring 11 and the swing plates 12. When the swing plates 12 are moved to a predetermined position by hand, they will remain there and will not be easily moved by unintentionally shaking. The elastic members 15 are compression springs or the like.

Figure 2:
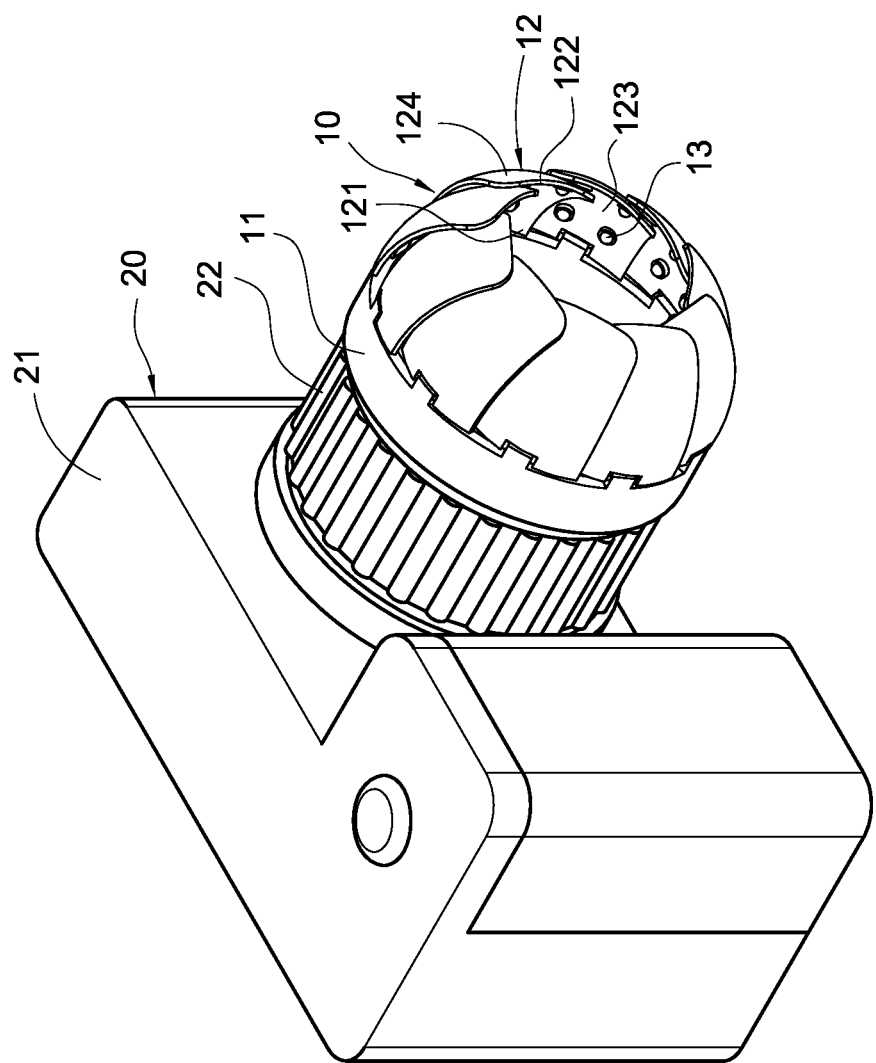
FIG. 2 is a schematic view of the illuminating apparatus in the closed status.
Figure 3:
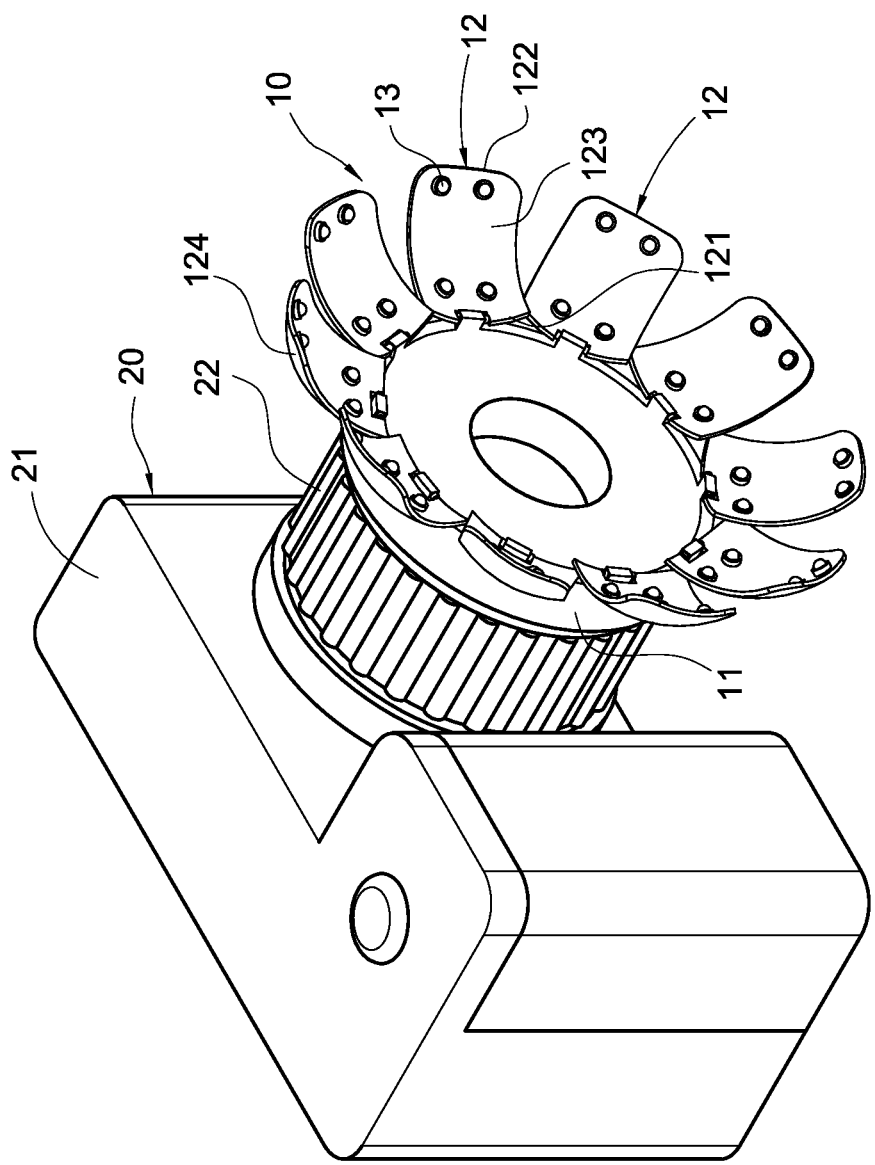
FIG. 3 is a schematic view of the illuminating apparatus in the opened status.

As FIG. 2 and FIG. 3 show, moving one of the swing plates 12 by hand or other kinds of external forces, the swing plates 12 can change their status from an opened status to a closed status. While in the closed status, as FIG. 2 shows, the free ends 122 of the swing plates 12 are close to each other and the inner faces 123 of the swing plates 12 face to each other. While in the opened status, as FIG. 3 shows, the free ends 122 of the swing plates 12 are away from each other and the inner faces 123 of the swing plates face to objects to be shot. Thus, the light elements 13 on the inner face 123 can emit light to the objects.

Besides, it should be noticed that, in this embodiment, each of the swing plates 12 overlaps with the other two adjacent swing plates 12 at opposite sides, no matter in the opened status or the closed status. Besides, each of the swing plates 12 is against the inner face 123 of one of the adjacent swing plate 12 and against the outer face 124 of the other adjacent swing plate 12. As a result, no matter in the opened status or the closed status, when each one of the swing plates 12 is moved inwardly or outwardly by hand, the rest of the swing plates 12 will move consequently. Since the swing plates 12 do not need to be moved one by one, it is very convenient for practical use.

Figure 4:
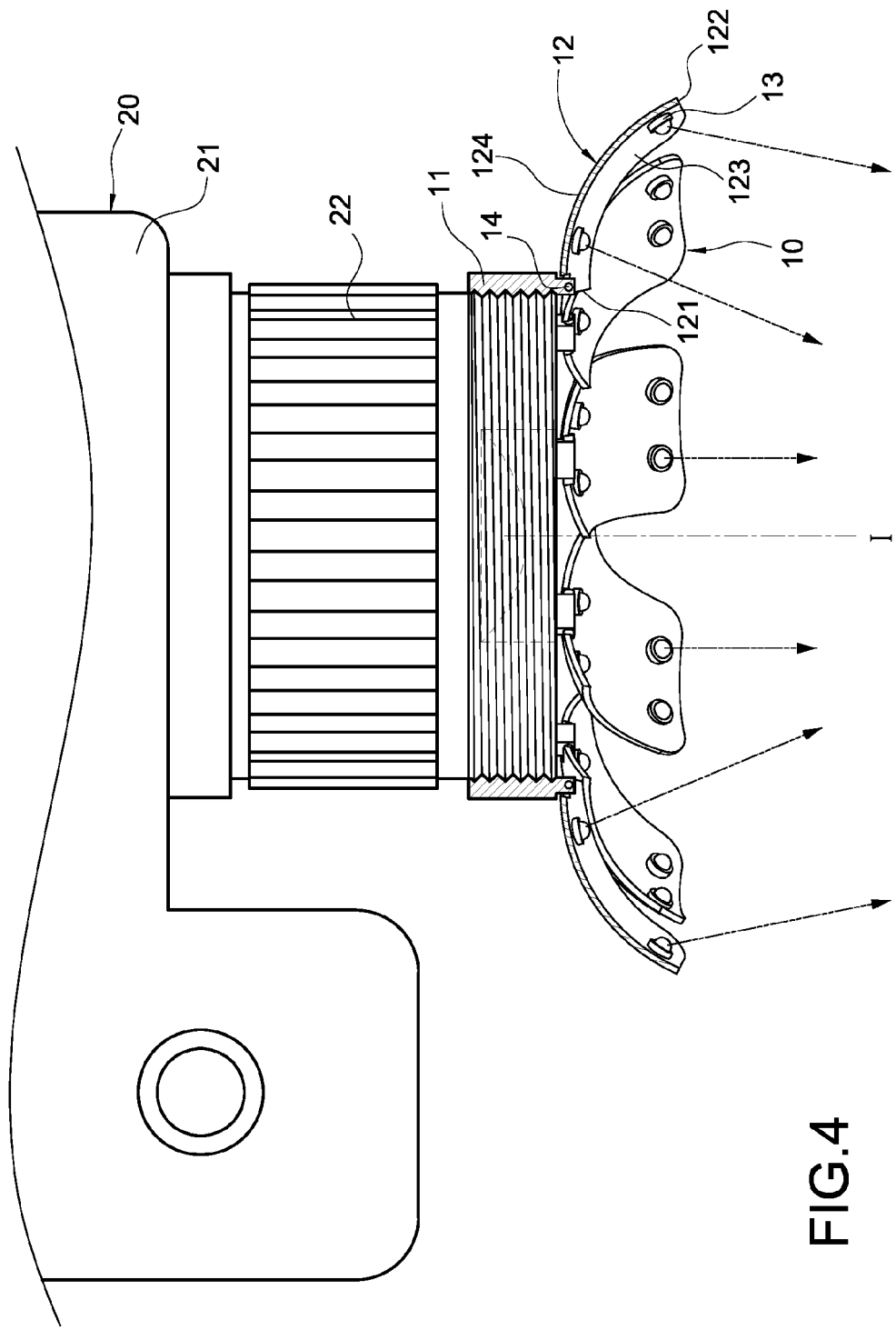
FIG. 4 is a partial cross-sectional view of the illuminating apparatus.

As FIG. 4 shows, since the swing angle of the swing plates 12 can be freely decided by user, user can adjust the illuminating angle of the light elements 13 on the swing plates 12 toward to the optical axis I to a proper angle according to the practical conditions such as distances to objects, so as to eliminate the non-uniform brightness distribution on the objects with a darker center portion and a brighter outer portion.

Figure 5:
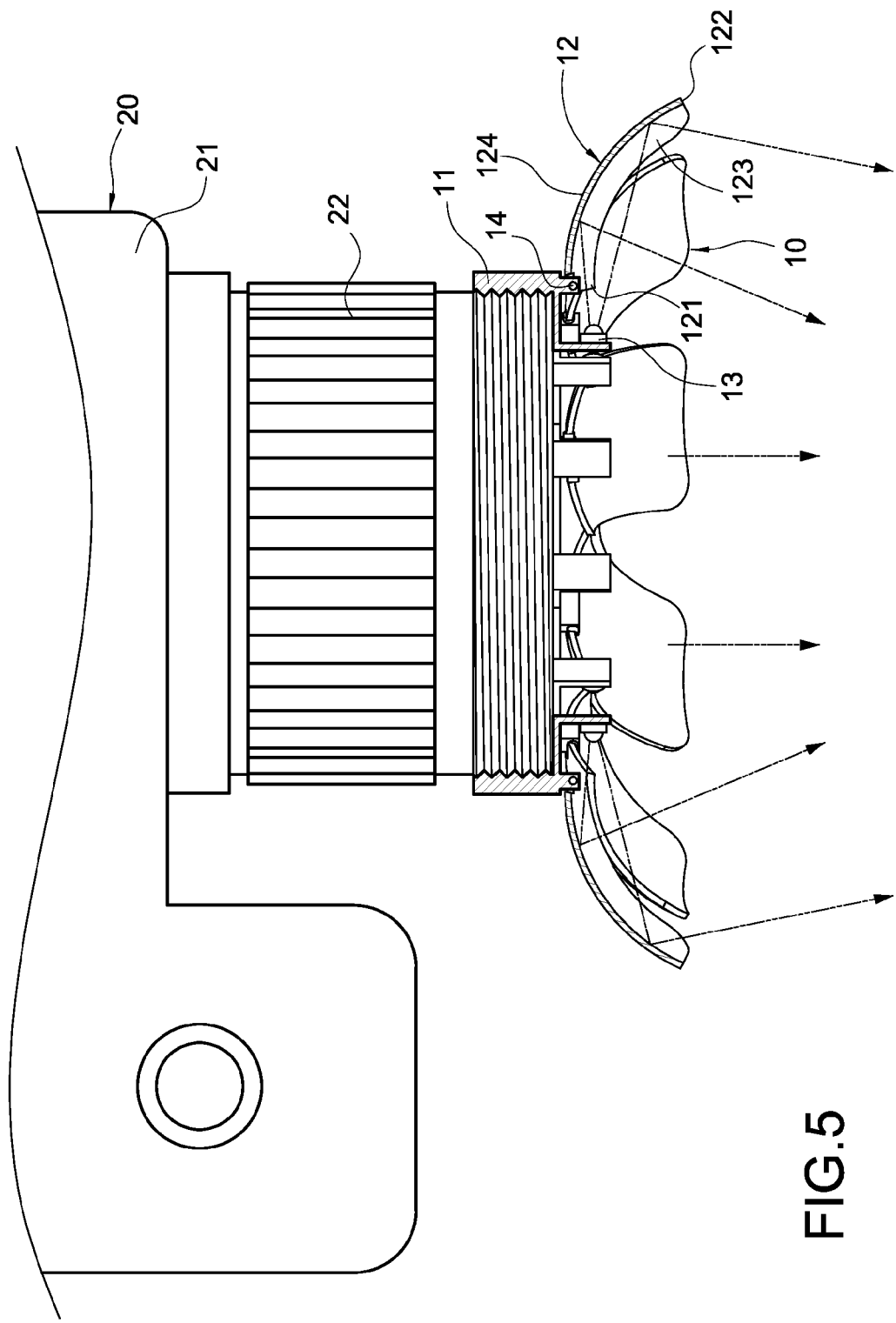
FIG. 5 is a schematic view of the illuminating apparatus according to the second embodiment of the present invention.

FIG. 5 shows a ring-shaped illuminating apparatus 10 with variable projection angle according to a second embodiment of the present invention. The second embodiment is substantially the same with the first embodiment except that the light elements 13 are arranged on the fixing ring 11 and emits light toward the inner faces 123 of the swing plates 12. After reflected by the inner faces 123, light can be projected to objects to be shot.

Figure 6:
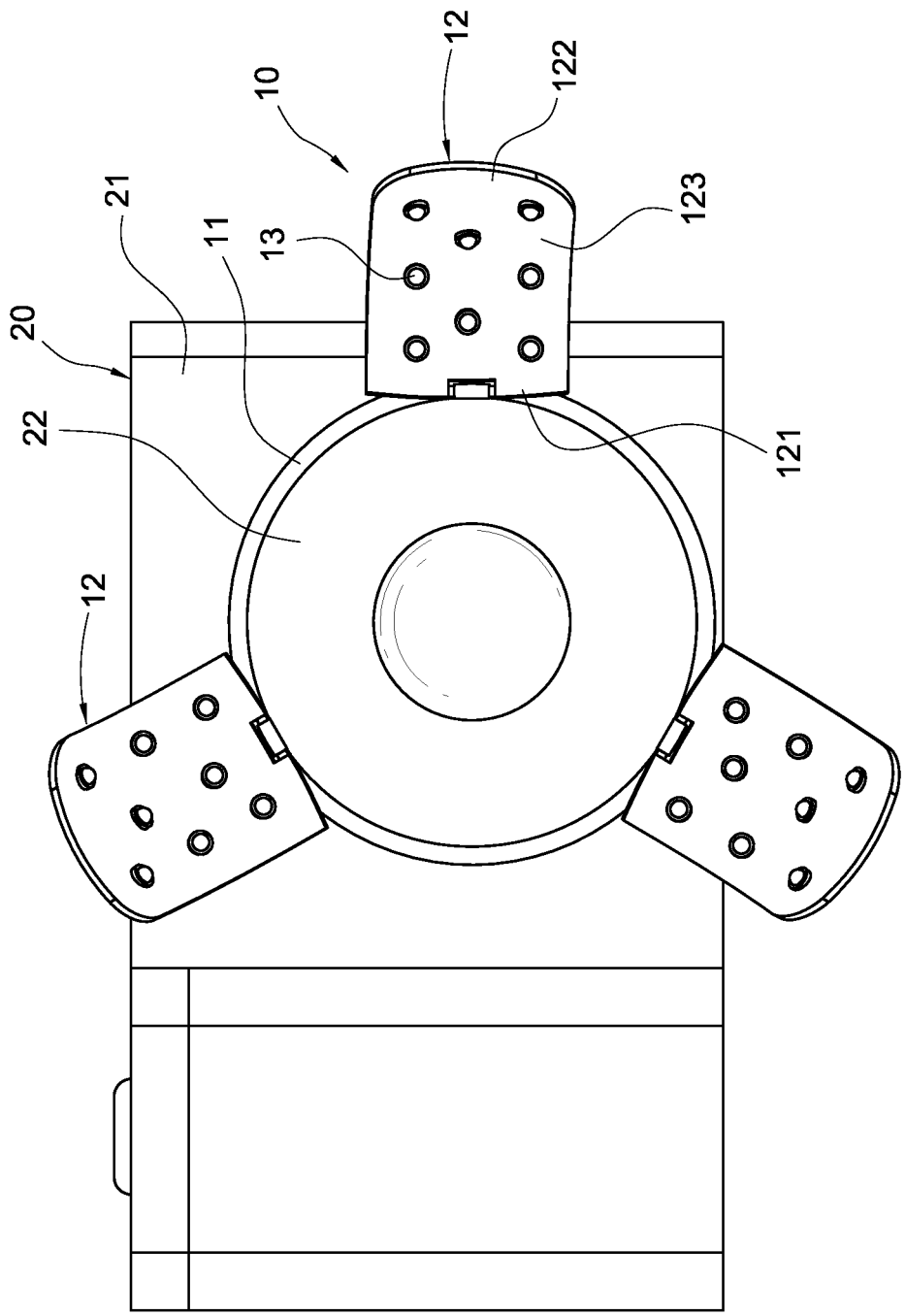
FIG. 6 is a partial cross-sectional view of the illuminating apparatus according to the second embodiment of the present invention.

FIG. 6 shows a ring-shaped illuminating apparatus 10 with variable projection angle according to a third embodiment of the present invention. The third embodiment is substantially the same with the first embodiment except that the number of the swing plates 12 is three, less than that in the first embodiment. Besides, each of the swing plates 12 does not overlap any other swing plates 12. In practical use, each of the swing plates 12 needs to be moved by hand one by one. However, since the number of the swing plates 12 is not much, user will not suffer a heavy loading in practical use.

Besides, it should be mentioned that the illuminating apparatus 10 can be fixed onto the main body 21 of the camera 20. And such an arrangement should take into account the dimensions of the illuminating apparatus 10 and the length of the lens 22, in order to avoid that light emitted from the light element 13 should be blocked by the lens 22.

While the invention has been described by means of specific embodiments, numerous modifications and variations could be made thereto by those skilled in the art without departing from the scope and spirit of the invention set forth in the claims.

What is claimed is:

1. A ring-shaped illuminating apparatus with variable projection angle, the ring-shaped illuminating apparatus arranging on a camera and comprising:
a fixing ring connected to the camera;
a plurality of swing plates each having a fixing end pivotally connected to the fixing ring and a free end away from the fixing end, wherein the swing plates can change their status from an opened status to a closed status, while in the closed status, the free ends of the swing plates are close to each other, while in the opened status, the free ends of the swing plates are away from each other, each of the swing plates has an inner face and an outer face opposite to the inner face, the inner faces of the swing plates faces to each other in the closed status; and
a plurality of light elements respectively arranged on the inner faces of the swing plates.

2. The ring-shaped illuminating apparatus as claim 1, wherein the swing plates are connected to the fixing ring at an equal interval.

3. The ring-shaped illuminating apparatus as claim 2, wherein each of the swing plates overlaps with the other two adjacent swing plates no matter in the opened status or the closed status, and each of the swing plates is against the inner face of one of the adjacent swing plate and against the outer face of the other adjacent swing plate.

4. The ring-shaped illuminating apparatus as claim 1, further comprising a plurality of pivot pins for pivotally connecting the swing plates to the fixing ring.

5. The ring-shaped illuminating apparatus as claim 4, further comprising a plurality of elastic members respectively arranged on the pivot pins and located between the fixing ring and the swing plates.

6. The ring-shaped illuminating apparatus as claim 5, wherein the elastic members are compression springs.

7. The ring-shaped illuminating apparatus as claim 1, wherein the light elements are light emitting diodes.

8. A ring-shaped illuminating apparatus with variable projection angle, the ring-shaped illuminating apparatus arranging on a camera and comprising:
a fixing ring connected to the camera;
a plurality of swing plates each having a fixing end pivotally connected to the fixing ring and a free end away from the fixing end, wherein the swing plates can change their status from an opened status to a closed status, while in the closed status, the free ends of the swing plates are close to each other, while in the opened status, the free ends of the swing plates are away from each other, each of the swing plates having an inner face and an outer face opposite to the inner face, the inner faces of the swing plates facing to each other in the closed status; and
a plurality of light elements respectively arranged on the fixing ring and emitting light toward the inner faces of the swing plates.

9. The ring-shaped illuminating apparatus as claim 8, wherein the swing plates are connected to the fixing ring at an equal interval.

10. The ring-shaped illuminating apparatus as claim 9, wherein each of the swing plates overlaps with the other two adjacent swing plates no matter in the opened status or the closed status, and each of the swing plates is against the inner face of one of the adjacent swing plate and against the outer face of the other adjacent swing plate.

11. The ring-shaped illuminating apparatus as claim 8, further comprising a plurality of pivot pins for pivotally connecting the swing plates to the fixing ring.

12. The ring-shaped illuminating apparatus as claim 11, further comprising a plurality of elastic members respectively arranged on the pivot pins and located between the fixing ring and the swing plates.

13. The ring-shaped illuminating apparatus as claim 12, wherein the elastic members are compression springs.

14. The ring-shaped illuminating apparatus as claim 8, wherein the light elements are light emitting diodes.

* * * * *